Aug. 21, 1956 G. M. BAIGENT 2,759,602
APPARATUS FOR DETECTING VARIATION OF SURFACE
CHARACTERISTICS OF OBJECTS
Filed July 17, 1952 3 Sheets-Sheet 1

Inventor
George M. Baigent
By
Wendroth, Lind & Ponack
Attorneys

Inventor
George M. Baigent

By
Wenderoth, Lind & Ponack
Attorneys

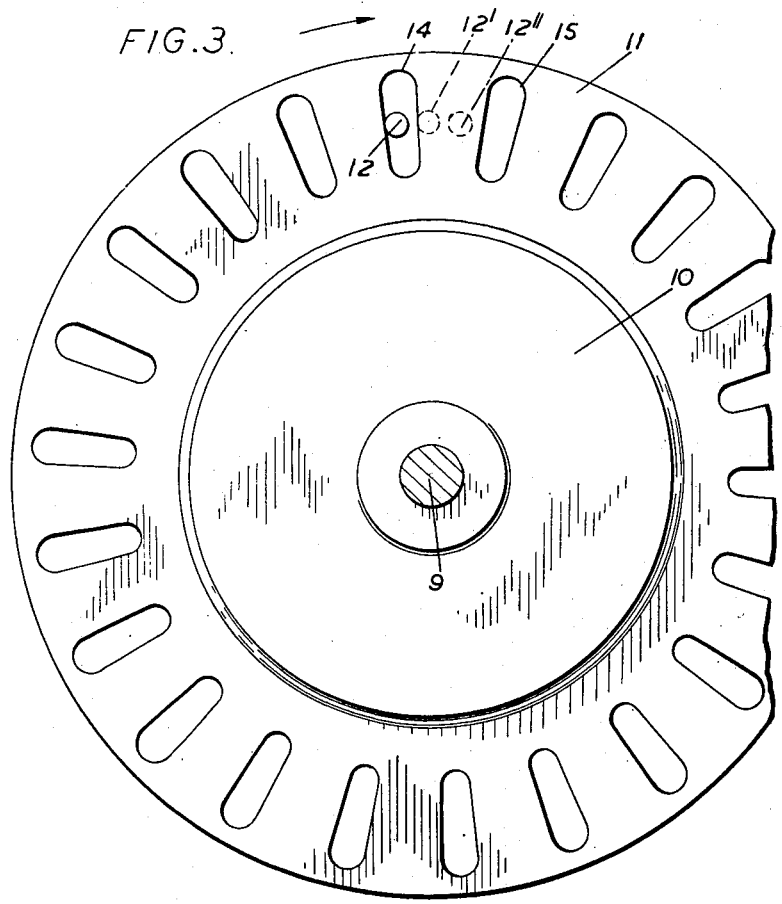
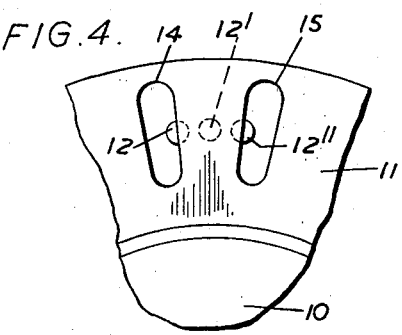

United States Patent Office 2,759,602
Patented Aug. 21, 1956

2,759,602

APPARATUS FOR DETECTING VARIATION OF SURFACE CHARACTERISTICS OF OBJECTS

George Mattey Baigent, River Cottage, Bourne End, Buckinghamshire, England

Application July 17, 1952, Serial No. 299,478

Claims priority, application Great Britain July 19, 1951

6 Claims. (Cl. 209—111)

This invention is for improvements in or relating to apparatus for detecting variation of surface characteristics of objects and is more particularly concerned with the detection of minor surface variations on an object, that is to say, defects having a small surface area relatively to the area of the object itself or areas of small color difference relatively to the color of the remainder of the object.

In prior arrangements for sorting objects, such as seeds, the objects have been illuminated by a light source and the light reflected from the objects has been conveyed to a photo-sensitive element so that variations in the light reflected from the surface of the object can be measured so as to determine whether or no an object is sub-standard.

In connection with the sorting of seeds, such as peas and beans, it is, however, possible for the general color of some seeds to vary very appreciably from other seeds in the same batch although any particular such seed is not, in itself, sub-standard. The difficulty, therefore, is to distinguish between a generally light-colored seed having a small, dark patch upon its surface which should be rejected and another seed which is generally of a darker color but which contains no surface defects and which should therefore be accepted.

In the prior arrangements, such as that described in prior British specification No. 492,035, it would have been difficult or impossible to distinguish between the light-colored seed with the small, dark defect and the good, but generally dark-colored seed due to the fact that the unmarked portion of the light-colored seed has a higher light reflectance value than the wholly good, but dark, surface of the generally dark-colored seed.

According to the present invention, therefore, there is provided apparatus for observing and/or measuring the light reflectance of an object, for example, by means of a photo-sensitive element, comprising means for illuminating an object-viewing position, a plurality of light-receiving means directed at said object-viewing position, said means each comprising means for limiting the area viewed thereby, means for separately conducting light incident on the individual light-receiving means to a common place of observation and a controllable light-interrupting device for masking or deflecting the individual light beams so conducted that one or some only are viewed at any given instant of time. The light-interrupting device should preferably be so designed that the area of the light beams unmasked or undeflected at any given instant remains substantially constant, that is to say, for example, that as one light beam is being masked a corresponding area of another light beam is being unmasked. It will be understood that with this arrangement and with the plurality of light-receiving means each so disposed as to view different parts of an object in the object-viewing position, the light incident upon a photosensitive element can be arranged to be due to light reflected from a much smaller portion of the surface of the object being viewed than could otherwise be achieved without at the same time failing to explore the whole or a major portion of the surface of the object. Thus, by cutting down the percentage of the area of an object viewed by the individual light-receiving means, and by arranging at any given instant to conduct light to a photo-sensitive element from, say, only one of the light-receiving means, the area represented by a small surface defect will form a higher proportion of the surface of the object being viewed at any given instant of time so that the reduction in the total reflectance due to a small surface defect or variation is not compensated or even over-compensated by a possibly generally very high reflectance value from other portions of the surface of the object being viewed and hence the sensitivity of the apparatus is increased.

A feature of the invention consists in that the said controllable light interrupting means comprises a rotating member having one or more apertures therein so disposed as to register with the individual light beams successively one by one on rotation of the said rotating member.

A further feature of the invention consists in that the individual light beams from the plurality of light-receiving means are brought to a common place of observation to be disposed side by side, preferably along an arc of a circle.

As alternatives to the above-mentioned rotating shutter mechanism, a wide variety of other controllable light-interrupting devices may be used, for example, a moving mirror arrangement, e. g. a mirror drum, which will reflect at any given instant light conducted from only a single viewing means on to the photo-sensitive element, may be disposed so as to receive the light conducted from the several viewing means; a Kerr cell or other device may be used in which variation of applied physical stress or electrostatic or magnetic field causes a variation of the transparency of the material to take place and such a device may be interposed in front of the photo-sensitive element.

Any suitable and convenient means may be adopted for conducting the light from the individual light-receiving means to a common place of observation and one particularly suitable arrangement is that described in my copending application Serial No. 299,477 with which apparatus, the apparatus of the present invention may be advantageously combined.

The following is a description with reference to the accompanying drawings of one embodiment of the present invention in combination with the apparatus of my above-mentioned copending application in which:

Figure 3 is a front elevation of the light interrupting means,

Figure 4 is a partial view showing the light interrupting means of Figure 3 in a different position.

Figure 1:
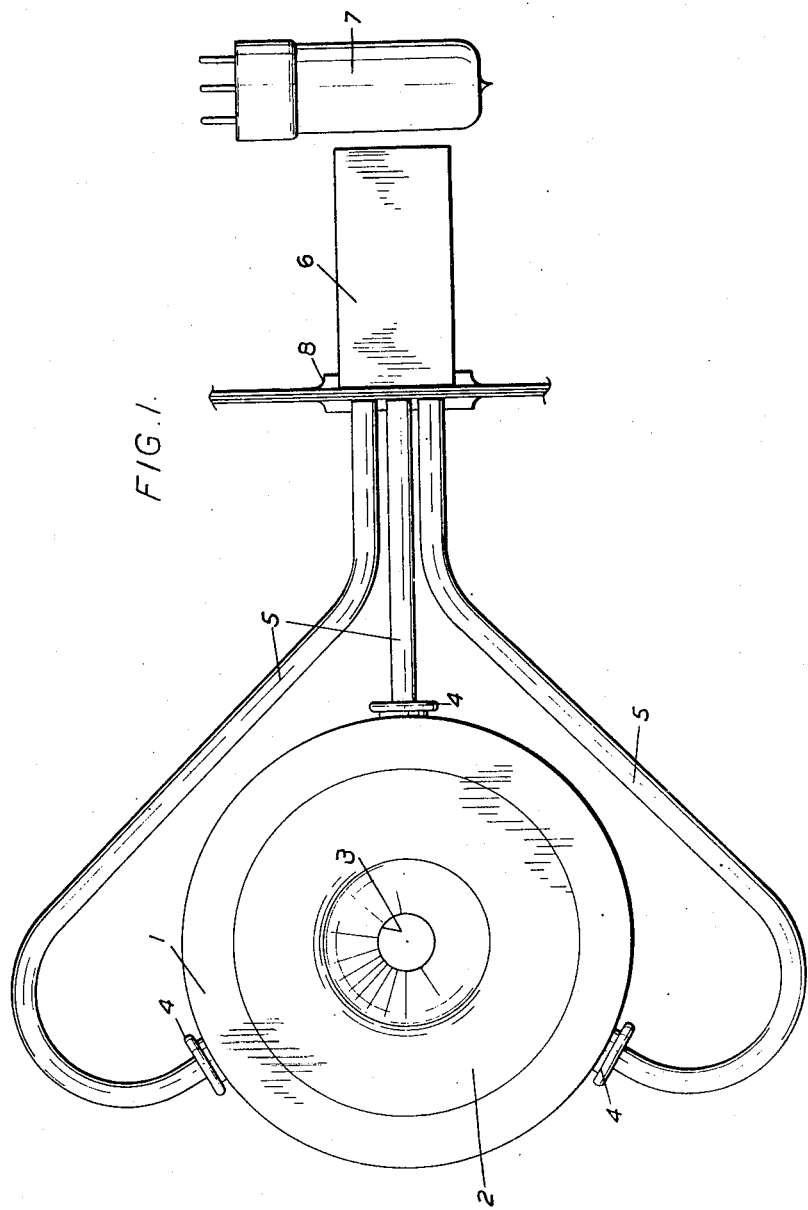
Figure 1 is a plan view of a general arrangement of the combination apparatus.

Referring to Figure 1 of the drawings there is shown in plan view the casing 1 provided with a dished top plate 2 having a central apereture in which is disposed a transparent tube 3 and means for illuminating the space within the tube 3, the casing carrying, as indicated at 4, three light-receiving means comprising lenses, aperture stops and field-stops all as described in detail in my copending application Serial No. 299,477.

Each of the three light receiving means generally indicated at 4 has operatively connected thereto a glass rod 5 for conducting light reflected into the light-receiving means 4 either from the background or from an object within the transparent tube 3 and conducting it to a common place of observation by reason of the three glass rods 5 being brought close together in parallel as seen in the figure.

A rectangular block of glass 6 is disposed a short distance away from the ends of the three glass rods 5 so as to receive light therefrom and, by multiple internal reflection within the block 6, to transmit to the light-sensitive cell generally indicated at 7, a generally uniformly illuminated field of light transmitted by the three glass rods 5.

Figure 2:
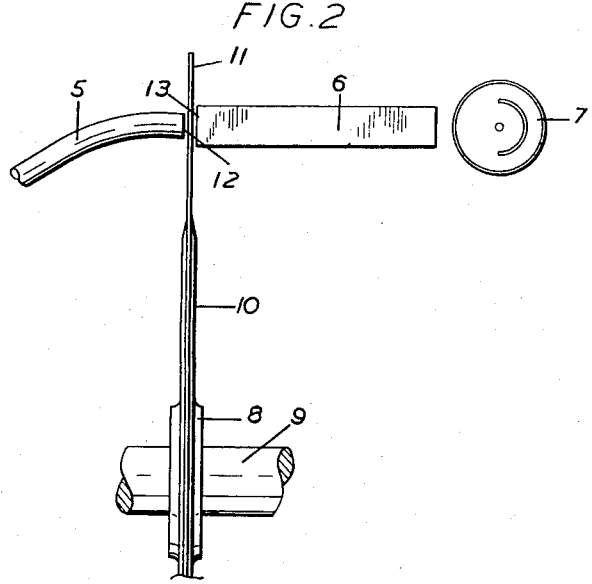
Figure 2 is a part sectional side elevation of Figure 1.

Disposed between the ends of the three glass rods 5 and the glass block 6 is the light interrupting device generally indicated at 8 in Figure 1 and shown in greater detail in Figures 2 and 3.

Referring to Figures 2 and 3 it will be observed that the light interrupting device 8 is mounted upon a shaft 9 and has a central disc member 10 and a thinner peripheral extension 11 of the disc 10, which thinner peripheral portion 11 is disposed between the ends 12 of the glass rods 5 and the cooperating end 13 of the glass block 6.

The said peripheral disc portion 11 is formed with a plurality of slots of which two are indicated at 14 and 15.

It will be appreciated from consideration of Figures 2 and 3 that, on rotation of the light interrupting device 8, the several slots 14 and 15 will be caused to pass across the ends 12, 12', 12'' of the three glass rods 5 succesively uncovering the rod ends so that light conducted therethrough can pass into the rectangular block 6 and thence to the light-sensitive cell 7.

Referring to Figure 3, the side edges of the slots 14, 15 are each disposed on a radius of the disc and it will be observed that the width of the slots is equal to the diameter of the end 12 of the rod 5 plus the distance between adjacent rod ends 12 and 12'.

With this arrangement it will be realized that, looking at Figure 3, rotation of the disc 10 in a direction indicated by the arrow from the position shown in the figure will lead to the rod 12' being uncovered to exactly the same extent as the rod end 12 is being masked so that, with equal amounts of light being conducted along the three rods 5, a uniform intensity of light will be transmitted to the light-sensitive cell 7.

Figure 5:
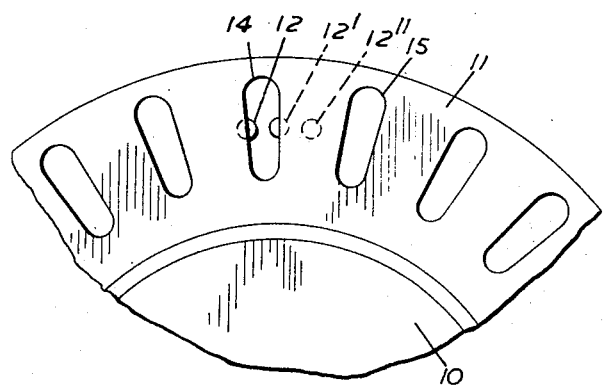
Figure 5 is a further partial view of light interrupting means of Figure 3 in a further different position.

Figure 4 illustrates the situation when the disc 10 of Figure 3 is in a position slightly before that shown in Figure 3, namely with the rod ends 12 and 12'' each half uncovered whilst, in Figure 5, the disc 10 is shown in the position slightly after that illustrated in Figure 3, namely with the adjacent rod ends 12 and 12' equally unmasked.

By suitable adjustment of the illumination within the casing 1 and by suitable control of the amount of light conducted by the individual glass rods 5 and, if necessary, by appropriately shaping or masking the ends 12, 12' and 12'' of the rods 5, a substantially constant level of illumination of the photo-sensitive surface of the cell 7 can be achieved so that, if through any one of the light-receiving means 4, a dark stain is observed on an object falling through the transparent tube 3, then the light conducted by that particular glass rod 5 will be different from that conducted by the other rods 5 and will, therefore, produce instantaneously, on the photo-sensitive surface of the cell 7, an excitation different from that produced by the above-mentioned steady illumination thereby yielding an indication of the existence of a stain or other imperfection on the object being viewed.

As has been hereinbefore mentioned, the use of the light interrupting device of the present invention, particularly in its combination with the apparatus of my above-mentioned copending application, makes it possible optically to explore at least a major portion of the surface of an object in small increments, thereby accentuating the difference in the light reflectance of any surface characteristics of the objects being viewed.

The invention may be broadly stated as comprising optically exploring the whole or a major portion of the surface of an object by detecting the value of light reflected therefrom through a number of viewing means on a photo-sensitive element and operating a light-interrupting device so as to interrupt the passage of light from the several viewing means to said photo-sensitive element to permit light from one or some only of said viewing means to fall at any particular instant upon said photo-sensitive element.

It will be appreciated that the number of the viewing means, the area covered by each viewing means and the frequency with which the light-interrupting device is operated require to be correlated to the size of the object, to the area and density of the defect which is required to be detected and to the speed at which the object passes the viewing position in order to ensure that substantially the whole area of the object is examined.

I claim:

1. In an apparatus for sorting objects by the observation and measurement of light reflected by said objects and having an illuminated object viewing position to which said objects are supplied and a selector to select or reject objects, that improvement comprising a plurality of light-receiving means disposed around and directed at said object viewing position to view at least the major part of a circumferential strip of an object in said position, means connected to each of said light receiving means for separately and directly conducting light reflected through said light receiving means from an object in said object viewing position to a single photo-sensitive element, and a controllable light-interrupting device for continuously and regularly interrupting the individual light beams so controlled that at least one and not more than two of said beams are viewed by the photo-sensitive element at any given instant of time, said photo-sensitive element being adapted to be connected to said selector to actuate it to select or reject said objects in accordance with the light reflected by them and conducted to and viewed by said photo-sensitive element.

2. Apparatus according to claim 1 wherein the light-interrupting device is a rotatable disc formed with a plurality of apertures therein which apertures are slots whose side edges each lie upon a radius of the rotating member and whose width is the sum of the width of one light beam and the space between two adjacent light beams at the place of observation.

3. Apparatus according to claim 2 wherein the arcuate distance between adjacent slots is such that the relationship of the leading edge of one slot to one light beam is exactly the same as the trailing edge of a preceding slot to another light beam whereby the timing and rate of unmasking of one light beam coincides exactly with the timing and rate of masking of another light beam.

4. The improvement as claimed in claim 1 and a common light-conducting means in which the separate light beams are mixed by internal reflection disposed between the light-interrupting device and the photo-sensitive element.

5. In an apparatus for the observation and measurement of light reflected by objects, the combination of an illuminated object viewing position to which objects are supplied, a plurality of light-receiving means disposed around and directed at said object viewing position to view at least the major part of an object in said position, means connected to each of said light receiving means for separately and directly conducting light reflected through said light receiving means from an object in said object viewing position to a single photo-sensitive element, and a controllable light-interrupting device for continuously and regularly interrupting the individual light beams so controlled that at least one and not more than two of said beams are viewed at any given instant of time, said photo-sensitive element observing the light reflected by the objects.

6. In an apparatus for the observation and measurement of light reflected by objects having an illuminated object viewing position to which said objects are supplied, the combination of a plurality of light-receiving means disposed around and directed at said object viewing position to view at least the major part of an object in said position, means connected to each of said light receiving means for separately and directly conducting light reflected through said light receiving means from an object in said object viewing position to a single photo-sensitive element, and a controllable light-interrupting device for continuously and regularly interrupting the individual light beams so controlled that at least one and not more than two of said beams are viewed at any given instant of time, said photo-sensitive element observing the light reflected by the objects.

References Cited in the file of this patent

UNITED STATES PATENTS

| | | |
|---|---|---|
| 1,556,766 | Yoarrondo | Oct. 13, 1925 |
| 1,945,395 | Cockrell | Jan. 30, 1934 |
| 1,981,999 | French | Nov. 27, 1934 |
| 1,996,233 | Darrah | Apr. 2, 1935 |
| 2,066,934 | Gulliksen | Jan. 5, 1937 |
| 2,244,826 | Cox | June 10, 1941 |
| 2,256,595 | Metcalf | Sept. 23, 1941 |
| 2,268,498 | Bryce | Dec. 30, 1941 |
| 2,337,535 | Acs | Dec. 28, 1943 |
| 2,410,956 | Benjamin | Nov. 12, 1946 |
| 2,505,420 | McCrary et al. | Apr. 25, 1950 |
| 2,506,672 | Kell et al. | May 9, 1950 |
| 2,583,132 | Altar et al. | Jan. 22, 1952 |
| 2,613,809 | Potts | Oct. 14, 1952 |
| 2,646,880 | Frankel | July 28, 1953 |
| 2,656,923 | Cox | Oct. 27, 1953 |

FOREIGN PATENTS

| | | |
|---|---|---|
| 294,575 | Great Britain | July 20, 1928 |
| 470,638 | Great Britain | Aug. 17, 1937 |
| 712,113 | Great Britain | July 21, 1954 |